United States Patent [19]
Kumada

[11] Patent Number: 4,663,556
[45] Date of Patent: May 5, 1987

[54] TORSIONAL MODE ULTRASONIC VIBRATOR

[75] Inventor: Akio Kumada, Kokubunji, Japan

[73] Assignee: Hitachi Maxell, Ltd., Osaka, Japan

[21] Appl. No.: 688,947

[22] Filed: Jan. 4, 1985

[30] Foreign Application Priority Data

| Jan. 11, 1984 | [JP] | Japan | 59-001874 |
| Jan. 13, 1984 | [JP] | Japan | 59-003641 |
| Aug. 22, 1984 | [JP] | Japan | 59-173182 |
| Aug. 22, 1984 | [JP] | Japan | 59-173183 |

[51] Int. Cl.$^4$ .......................................... H01L 41/08
[52] U.S. Cl. .................................. 310/333; 310/323; 310/328
[58] Field of Search ............... 310/323, 328, 317, 333

[56] References Cited

U.S. PATENT DOCUMENTS

| 3,171,696 | 3/1965 | Houghton | 310/333 X |
| 4,019,073 | 4/1977 | Vishnevsky | 310/333 X |
| 4,210,837 | 7/1980 | Vasilieu et al. | 310/333 |
| 4,325,264 | 4/1982 | Sashida | 310/328 X |
| 4,495,432 | 1/1985 | Katsuma | 310/328 |

FOREIGN PATENT DOCUMENTS

| 0576648 | 10/1977 | U.S.S.R. | 310/323 |
| 0623241 | 9/1978 | U.S.S.R. | 310/328 |
| 0670992 | 6/1979 | U.S.S.R. | 310/328 |
| 0794700 | 1/1981 | U.S.S.R. | 310/323 |

Primary Examiner—Mark O. Budd
Attorney, Agent, or Firm—Birch, Stewart, Kolasch & Birch

[57] ABSTRACT

A torsional mode ultrasonic vibrator is formed by integrally combining a piezoelectric thickness vibrating element and a cylindrical torsional mode resonator. Furthermore, a torsional mode piezoelectric motor is provided in such a manner that a rotor and a stator are pressed to each other so that a rotational torque can be generated by the vibration at the contacting surfaces therebetween and a piezoelectric thickness vibrator and a torsional mode ultrasonic vibrator formed by an integral combination of a torsion coupler and a torsional mode ultrasonic resonator are used as the source of the ultrasonic vibration.

9 Claims, 38 Drawing Figures

Fig. 22
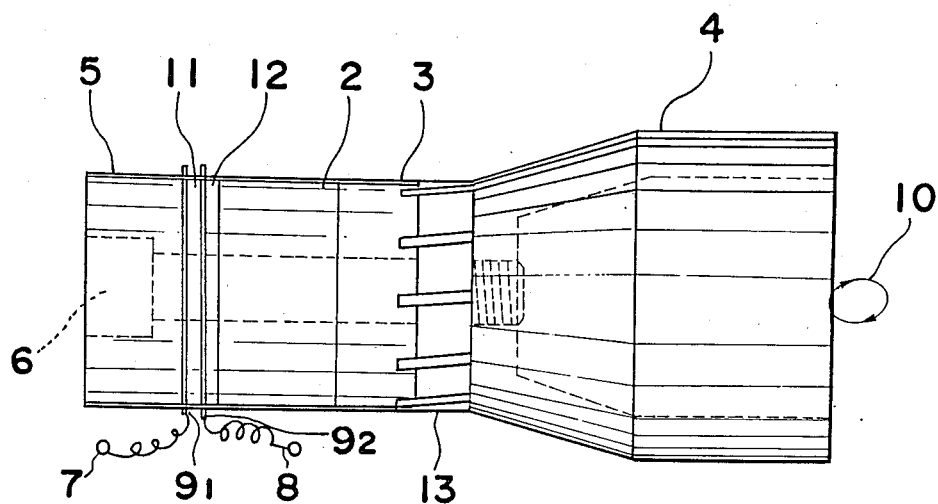
Fig. 23a
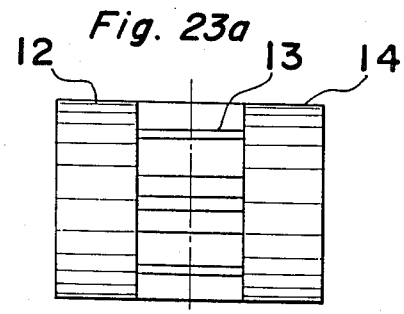
Fig. 23b
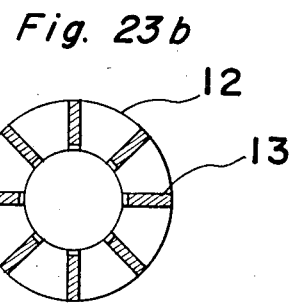
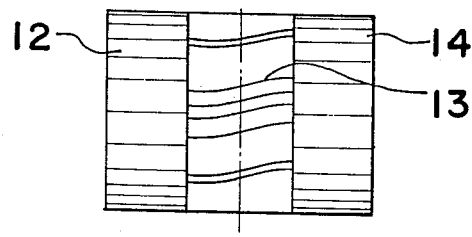
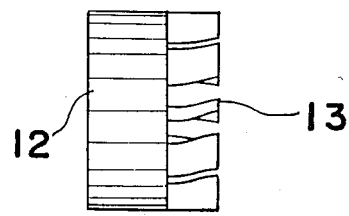
Fig. 23c
Fig. 23d

TORSIONAL MODE ULTRASONIC VIBRATOR

FIELD OF THE INVENTION

The present invention relates to an ultrasonic vibrator, more particularly to an ultrasonic vibrator for generating a torsion torque by the use of an ultrasonic resonator and a motor using said device.

BACKGROUND OF THE INVENTION

The conventional ultrasonic resonators are designed to produce intensive longitudinal vibration, as represented by Langevin type on. On the other hand, there have recently been developed techniques to utilize strong rotation torque by ultrasonic vibration such as as in ultrasonic motor, ultrasonic parts feeder, etc.

While there have been proposed various methods of generating rotary torque, it is considered most superior to take a method of producing an elliptical vibrational motion on the surface of the stator of the motor and rotating the rotor which is accommodated under pressure contact thereto. Although it is convenient if the vibrating surface of the ultrasonic resonator can be directly utilized as a stator, it was not possible to find a method of efficiently generating the intensive elliptical vibrational motion on the surface of one ultrasonic resonator, and it was necessary to combine plural resonators and only the inefficient and low vibration could be generated, so that the practical utility was insufficient.

SUMMARY OF THE INVENTION

The present invention is designed to remedy the above mentioned defects of the conventional art. It is characterized by an ultrasonic vibrator for exciting a torsional vibration to the torsion mode resonator by the use of a piezoelectric vibrator, comprising a unilateral combination of a piezoelectric thickness vibrator and a torsional mode resonator.

As a result of the extensive study on the problematic points of the above conventional art, the present inventors found that, when a piezoelectric thickness vibrator and a torsional mode resonator are connected in unilaterally and the shrinking/stretching vibration is applied in an vibration frequency to resonate the inherent torsion vibration of the resonator by means of the piezoelectric thickness vibrators, it is possible for the resonator to vibrate a torsional vibration. The present invention is based on this finding.

As a vibrator, one which has a bar-like configuration may have an inherent torsion vibrational and vibrate a torsion vibration. Particularly when it has a cylindrical shape, it has an advantageous facility to vibrate the torsion vibration.

Moreover, when a torsion connector or a longitudinal mode resonator is positioned between the piezoelectric thickness vibrator and the torsional mode resonator, the torsional mode resonator is made to vibrate a more definite and intensive torsional vibration. Further, when a cylindrical torsional vibrator is used, by adequately selecting the diameter corresponding to the length of the cylinder and the wall thickness, it is possible to generate a bending mode travelling wave on the surface of the cylinder or a bending mode fixed wave symmetrical along the circumference, or elliptical vibrations in cycles reverse to each other to the axis at a pair of the end faces symmetric to the axis of the vibrator.

BRIEF EXPLANATION OF THE DRAWINGS

FIG. 4 is a front view of a further modification of the vibrator according to the present invention, FIG. 5 is a cross sectional view of a still further modification of the vibrator according to the present invention, FIG. 22 is a side view showing a further modification of the vibrator according to the present invention, FIGS. 23(a) through 23(d) are respectively schematic diagrams showing way of making the torsional coupler employed in the torsional mode ultrasonic vibrator according to the present invention.

DETAILED DESCRIPTION OF THE PREFERRED EMBODIMENT OF THE INVENTION

Figure 1:
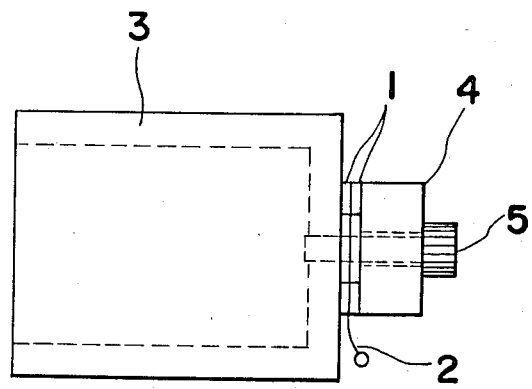
FIG. 1 is a front view showing one embodiment of a torsional mode ultrasonic vibrator according to the present invention.
Figure 2:
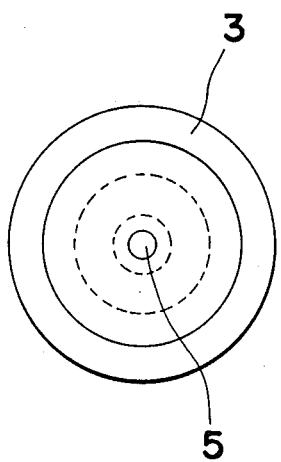
FIG. 2 is a right side view of the torsional mode ultrasonic vibrator shown in FIG. 1.

FIG. 1 and FIG. 2 show the front view and the side view of an embodiment of the ultrasonic vibrator according to the invention. In the figures, reference numeral 1 is a ceramic piezoelectric thickness vibrator, 2 is a lead wire provided on the electrode of the piezoelectric thickness vibrator 1, 3 is a torsional resonator, 4 is a washer, and 5 is a cap bolt for tightening them.

As shown in these figures, the torsion resonator 3 of the vibrator of the present invention has a basic figure of bottomed cylindrical shape, with either of the basic form or of a slight modification thereof. The conditions of combination of torsional and bending modes depend on the height and the wall thickness of the cylindrical torsional resonator 3, and the factor to combine them is the diameter of the cylinder. When the diameter is changed, the mode of combination changes, so that it is possible to realize optionally various vibration modes onto the vibrator.

Figure 3:
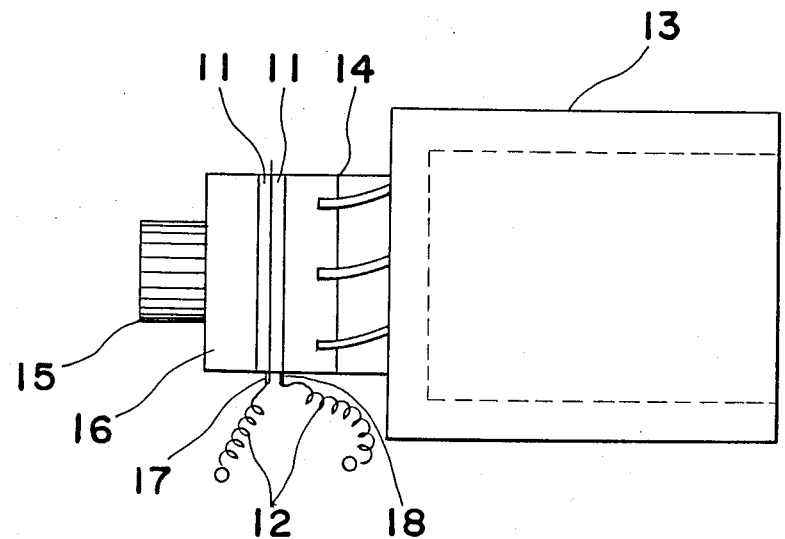
FIG. 3 is a front view of an modification of the torsional mode ultrasonic vibrator according to the present invention.
Figures 4, 5:
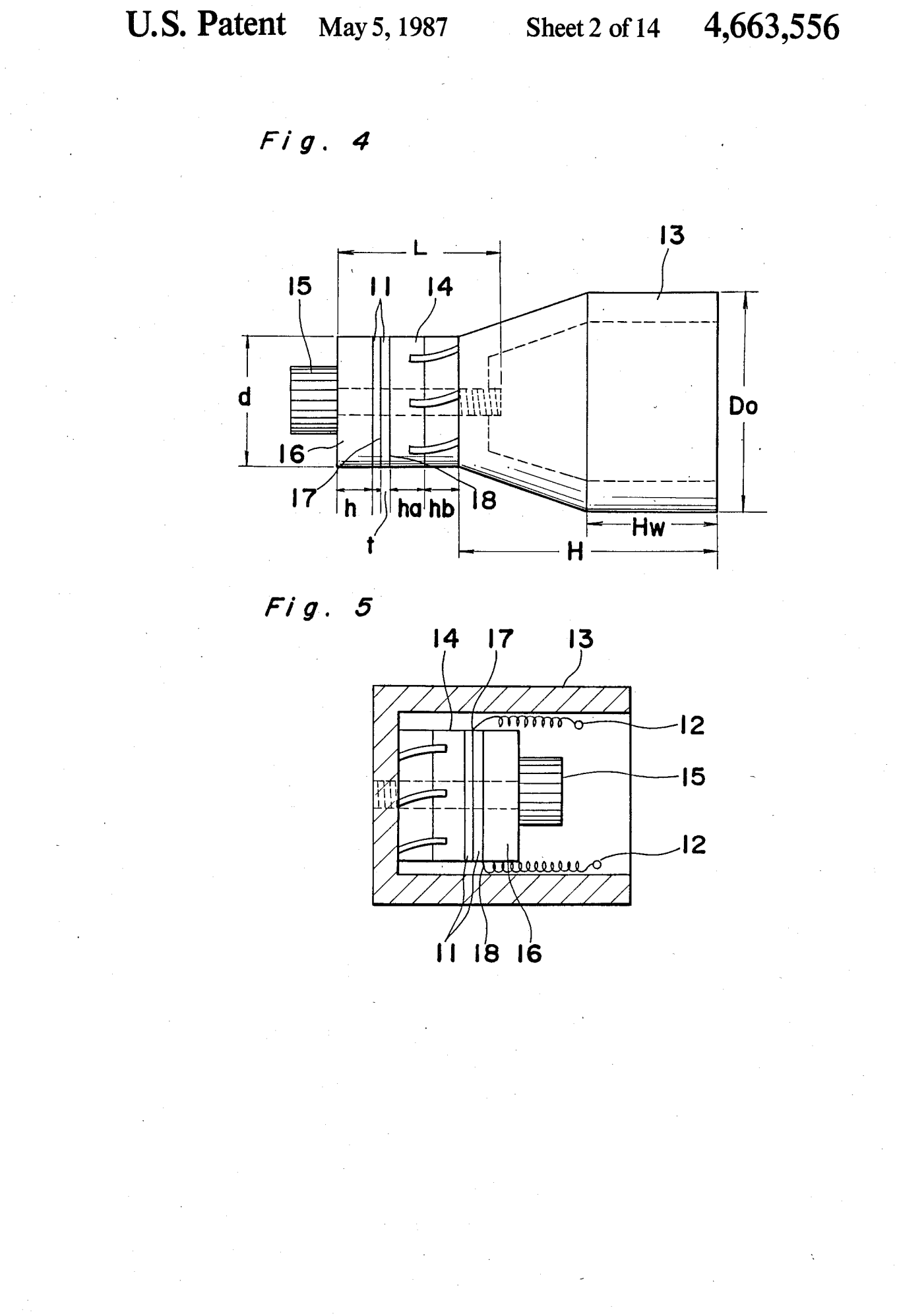

Although the shape in appearance of the actual vibrator is one for which a torsion coupling 14 is utilized as shown in FIG. 3 and FIG. 4, the torsion coupling 14 is only a means of improving efficiency for generating torsion vibration on the torsional resonator 13 by the use of a piezoelectric thickness vibrator 11, so that the torsion coupling may be omitted, as shown in FIG. 1 and FIG. 2. That is to say, the resonance frequency of the torsion vibration to be generated on the vibrator is free from the effect of the torsion coupling. The longitudinal vibrator has been excluded, because it has been found utterly unnecessary. When a torsion coupling 14 is fixed to the bottom of the bottomed cylindrical torsional resonator 13 by tightening the bolt 15, what gives the greatest effect upon the exciting conditions in the resonant state is unexpectedly the length of the bolt 15. Since the torsional/bending mode combined type ultrasonic vibrator according to the present invention can vibrate in various modes depending on designing condition and can have varied functions, so that the vibrator according to the present invention has an extensive use.

As it is not easy to explain how the vibration mode to be excited changes and how the function of the vibrator changes depending on the way of the design, 30 typical examples have been selected from th embodiments and shown in the following table. These examples show how the vibrational mode and the vibrator function excited onto the vibrator change according to the change of the dimensions of various parts on the torsional bending mode combined type ultrasonic vibrator of the invention. Here, in order to clarify the portions on which the dimensions are to be changed, the parts with dimensions are shown in FIG. 4. The parts which have been made into the same size throughout the embodiment are the wall thickness of the torsional resonator, 7 mm, and the thickness of the piezoelectric vibrator, 2 mm. If these figures are changed, the results become complicated in appearance and provide only a likelihood of causing a confusion, and it has not been possible to find the contents to be added essentially as new information. Thus, any other exemplification has been omitted.

In the table, the dimensions to be altered have been roughly classified into five groups of torsional resonator, torsion connector, piezoelectric vibrator, washer, and bolt. As to the resonator, connector, and piezoelectric vibrator, the contents have been sub-divided because of the plural places which require change of dimensions. In the embodiments, the elements are shown in the order of the size of diameter of the resonator, and the boundary between the groups is divided by double lines. The resonance frequency, vibrational mode, and function of the vibration mode to be excited according to the change of dimension are shown in the right column.

The forms of the torsional bending mode combined type ultrasonic vibrator of the invention can be roughly classified into three kinds as shown in FIGS. 3, 4, and 5. The vibrators shown in FIG. 3 and FIG. 5 comprise the same parts, but there is a difference in the way the respective components are combined. The vibrator of FIG. 5 has a construction including torsion connector 14, a ceramic piezoelectric vibrator 11, and a washer 16 inside the torsion resonator 13 and they are fixed by tightening with a bolt 15 from inside, being characteristic of more compact and suitable for utilizing the vibration on the outer surface at the bottom of the resonator.

Against the above, the vibrator of FIG. 4 is formed in so that the cylinder of torsion resonator 13 is not a straight cylinder but its shape is trapezoid in side view. The difference of the type of FIG. 4 from those of FIGS. 3 and 5 is discernible from the observation whether the cylinder size is H=Hw (types of FIG. 3 and FIG. 5) or H≠Hw (type of FIG. 4).

In the table, Examples 4 and 6 show Type A as shown in FIG. 3; and Examples 5 and 7 are Type C as shown in FIG. 5. Examples 8 to 16 show H−Hw=7 mm, having the configurations of the bottom of Type A chamfered rather than Type B, being classified into Type A. Examples 1, 2, 3, and 17 to 30 are of Type B as shown in FIG. 4. Type names are shown in the right end column of the table.

TABLE

Shape and vibration mode of torsional bending mode coupler type ultrasonic vibrator

| EX No. | torsional resonator | | | torsion coupler | | | piezo vibrator | | washer | bolt | resonance frequency | vibration mode | type |
|---|---|---|---|---|---|---|---|---|---|---|---|---|---|
| | $D_O$ | H | $H_W$ | $h_a$ | $h_b$ | b | d | t | h | l | $f_o$ | | |
| 1 | 120 | 65 | 40 | 30 | 8 | 8 | 35 | 2 | 15 | 65 | 25.37 | center of bottom rotate in left. periphery rotate in right. | B |
| 2 | 100 | 65 | 40 | 30 | 8 | 8 | 35 | 2 | 15 | 65 | 26.55 | bottom rotates | B |
| 3 | 80 | 65 | 40 | 15 | 8 | 8 | 35 | 2 | 12.5 | 50 | 27.48 | end face lateral parallel rotation (axis bends) | B |
| 4 | 80 | 65 | 65 | 15 | 8 | 8 | 35 | 2 | 10 | 50 | 21.58 | inner bottom disk floats up | A |
| 5 | 62.5 | 52.5 | 52.5 | 15 | 8 | 8 | 30 | 2 | 12.5 | 55 | 30.57 | outer bottom disk floats up | C |
| 6 | 62.5 | 52.5 | 52.5 | 8 | 8 | 8 | 30 | 2 | 10 | 45 | 27.79 | bottom rotates | A |
| 7 | 62.5 | 52.5 | 45.5 | 8 | 8 | 8 | 30 | 2 | 10 | 45 | 29.93 | bottom rotates | C |
| 8 | 60 | 70 | 62.5 | 8 | 8 | 8 | 30 | 2 | 10 | 45 | — | not rotate | A |
| 9 | 60 | 65 | 57.5 | 8 | 8 | 8 | 30 | 2 | 10 | 45 | — | not rerate | A |
| 10 | 60 | 60 | 52.5 | 8 | 8 | 8 | 30 | 2 | 10 | 45 | 27.22 | end face lateral parallel rotation (axis bends) | A |
| 11 | 60 | 57.5 | 50 | 8 | 8 | 8 | 30 | 2 | 10 | 45 | 27.96 | peripheral support reversible | A |
| 12 | 60 | 55 | 47.5 | 8 | 8 | 8 | 30 | 2 | 10 | 45 | 31.77 | peripheral support reversible | A |
| 13 | 60 | 50 | 42.5 | 30 | 8 | 8 | 30 | 2 | 10 | 65 | 31.29 | inner end rotates in left | A |
| 14 | 60 | 50 | 42.5 | 15 | 8 | 8 | 30 | 2 | 10 | 50 | 32.03 | peripheral support reversible | A |
| 15 | 60 | 45 | 37.5 | 8 | 8 | 8 | 30 | 2 | 10 | 45 | 31.97 | same above | A |
| 16 | 60 | 40 | 32.5 | 8 | 8 | 8 | 30 | 2 | 10 | 40 | 32.42 | same above strongest torque | A |
| 17 | 60 | 65 | 40 | 30 | 10 | 6 | 35 | 2 | 15 | 70 | 31.44 | cross vertical rotation at end face | B |
| 18 | 60 | 65 | 40 | 30 | 10 | 6 | 35 | 2 | 15 | 70 | 27.15 | circumferential rotation at end face | B |
| 19 | 60 | 55 | 30 | 16 | 6 | 8 | 35 | 2 | 15 | 60 | 32.39 | peripheral support reversible (n = 4) | B |
| 20 | 60 | 55 | 30 | 8 | 8 | 8 | 35 | 2 | 10 | 35 | 33.25 | 45 cut rotation at end face (n = 4) | B |
| 21 | 60 | 55 | 30 | 30 | 8 | 8 | 35 | 2 | 12.5 | 65 | 31.94 | cross vertical rotation | B |
| 22 | 60 | 55 | 30 | 30 | 8 | 8 | 35 | 2 | 12.5 | 65 | 31.94 | inner end rotates | B |
| 23 | 50 | 70 | 50 | 16 | 8 | 8 | 35 | 2 | 12.5 | 50 | 24.57 | inner end rotates (n = 3) | B |
| 24 | 50 | 65 | 40 | 16 | 8 | 8 | 35 | 2 | 12.5 | 50 | 26.43 | outer periphery rotates (n = 3) (3, rotor contact reversible) | B |
| 25 | 50 | 65 | 40 | 16 | 8 | 8 | 35 | 2 | 12.5 | 50 | 29.53 | inner face rotates | B |
| 26 | 50 | 65 | 40 | 16 | 6 | 8 | 35 | 2 | 12.5 | 50 | 31.03 | inner face rotates (n = 3) | B |
| 27 | 50 | 65 | 40 | 16 | 6 | 8 | 35 | 2 | 12.5 | 50 | 26.80 | inner face rotates | B |
| 28 | 50 | 55 | 30 | 16 | 8 | 8 | 35 | 2 | 17.5 | 55 | 31.18 | inner face rotates (n = 3) | B |
| 29 | 50 | 55 | 30 | 16 | 8 | 8 | 35 | 2 | 17.5 | 55 | 31.12 | inner face rotates | B |
| 30 | 50 | 55 | 30 | 16 | 8 | 8 | 35 | 2 | 14 | 50 | 31.49 | inner face rotates (n = 3) strongest | B |

Figure 6:
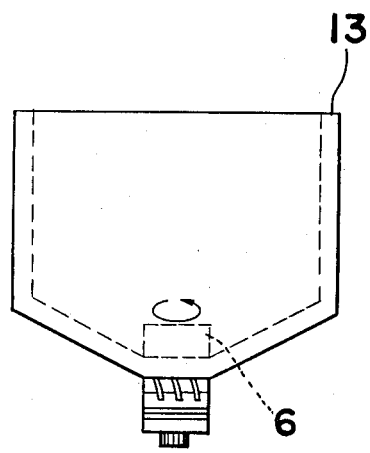
FIGS. 6 through 9 are respectively schematic diagrams showing ways of application of the vibrator shown in FIG. 1.
Figure 7:
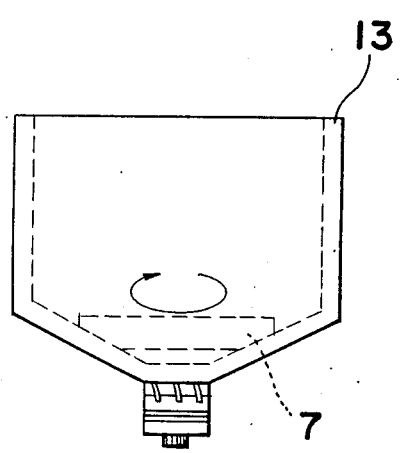

According to Example 6 of Type A vibrator, Examples 1 and 2 of Type B vibrator, and Example 7 of Type C vibrator, the rotor rotates when the disk shape rotor is fixed under pressure contact to the bottom surface during exciting the ultrasonic vibration on the surface of a vibrator. According to Example 1, when the small diameter disk 6 is fixed under pressure contact to the central part of the torsional resonator 13 as shown in FIG. 6, the resonator rotates anticlockwise. Then, when the disk is replaced with a large diameter one of 50 mm, it does not rotate. On the other hand, when changed to a larger diameter disk 7, clockwise rotation as shown in FIG. 7 occurred. In Example 2, the disk of 50 mm in diameter showed clockwise rotation with a strong torque.

Figure 8:
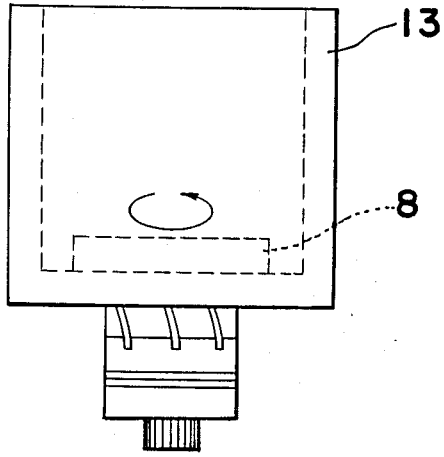

In Example 6, the bottom face of the resonator 13 is flat as shown in FIG. 8. When a disk 8 of 45 mm in diameter was fixed under contact pressure, anticlockwise rotation occurred at the resonance frequency of 27.79 KHz.

Figure 9:
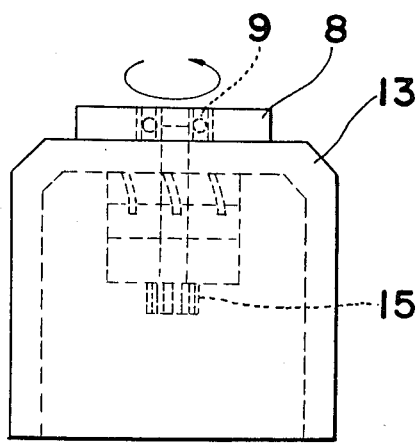

Example 7 has a shape as shown in FIG. 9 wherein the cylindrical torsion resonator 13 is chamfered at its bottom, and as the coupling and others are contained in the cylinder, its appearance is like a simple cylinder. Excitation was made with the bottom upside, and a disk like rotor 8 having a diameter of 45 mm was fixed under contact pressure to the outer surface of the bottom part of the resonator 13. Rotor 8 is accommodated at its central part with a bearing 9. Onto the rotary shaft of the bearing 9, a bolt 15 projecting from the center of the bottom surface of the vibrator 13 was accommodated and fixed under contact pressure. The rotor 8 was subjected to strong clockwise rotation at several tens of r.p.m. at the resonating frequency of 29.93 KHz. Then, Examples 8 and 9 were of the similar construction to Example 6, with slight modifications to the diameter and the length of the torsional resonator 13, but no rotation occurred.

Figure 10:
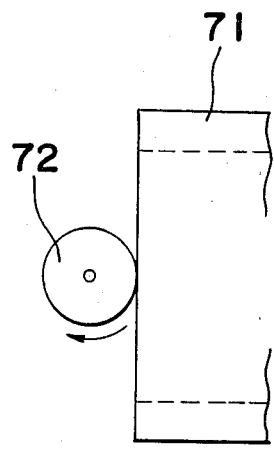
FIG. 10 is a schematic diagram showing a principle of a way of rotation of rotors using the vibrator shown in FIG. 1.
Figure 11:
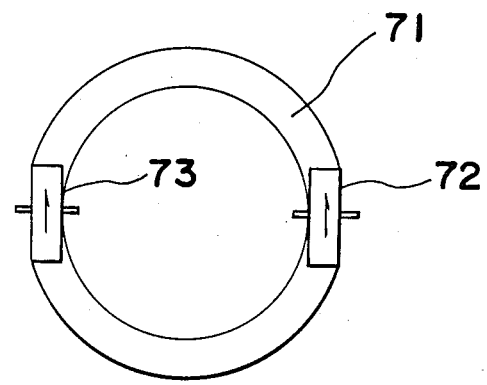
FIG. 11 is a side view of FIG. 10.

In Examples 3 and 10, as shown in FIGS. 10 and 11, when the rotors 72 and 73 rotatably supported by supporting shaft were brought into contact with the two spots on the bottom surface of the resonator 71 of the specified diameter of the cylindrical torsional resonator 71 under the condition that the supporting shaft is directed toward the diametrical direction respectively, the two rotors 72, 73 both strongly rotated in the same direction. It was presumed to be because the vibration in the mode of bending the shaft of the cylinder of the cylindrical torsional resonator 71.

In Examples 4 and 5, different from other cases, strong resonances occurred at about 21.5 KHz and about 30.5 KHz, respectively, but the disk placed on the bottom face did not rotate but floated up. That is to say, in Example 4, as shown in FIG. 8 and in Example 5, as shown in FIG. 9, the disk was set to excite respectively, whereupon the disk did not rotate as in other cases but floated up. Under this floating up condition, the disk may be freely rotated either clockwise or anticlockwise. Once it is rotated either clockwise or anticlockwise, it continues to rotate endlessly with not merely being floating condition but also free from friction of rotation.

Figure 12:
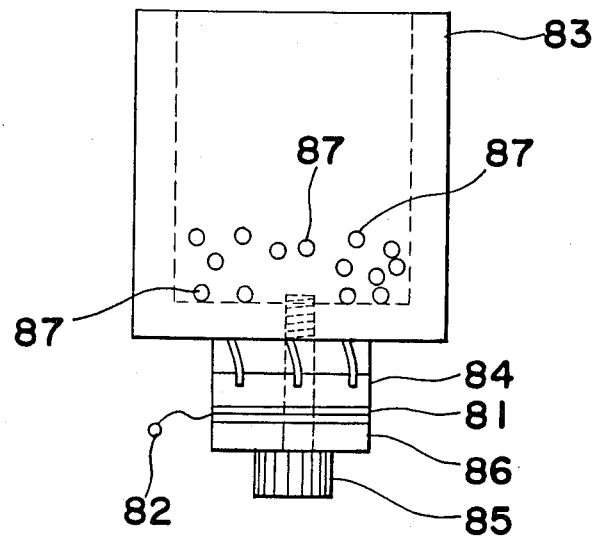
FIG. 12 is a schenatic diagram showing a way of floating steal balls using the vibrator shown in FIG. 1.

Now, when steel balls 87 of 3 mm in diameter were put in the cylinder of the resonator 83 of Example 4 as shown in FIG. 12, the balls 87 vigorously moved and sprung like water drops on a heated frying pan, but under a specified frequency, all of the balls 87 quietly floated up.

Figure 15:
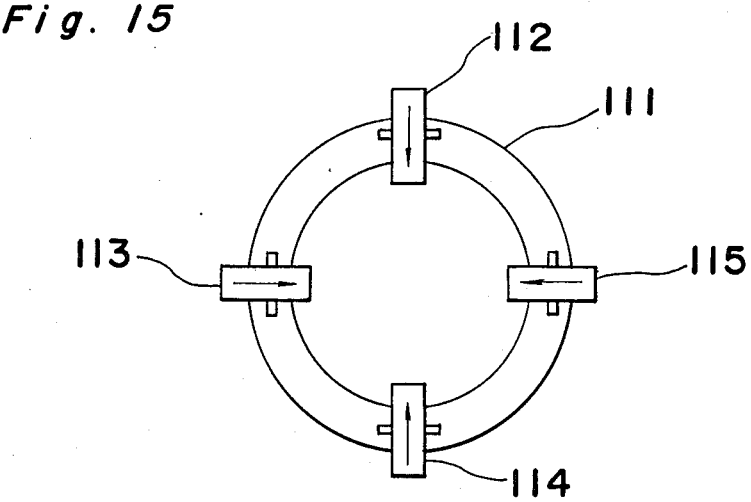
FIG. 15 is a top plan view showing a way of rotation of rotors using the vibrator according to the present invention.

In Examples 17 and 21, there were prepared four rotors 112, 113. 114 and 115 of the type similar to that used in Examples 3 and 10, and the rotors 112, 113, 114, and 115 were arranged at the four positions on the end face of the torsional resonator 111 on the diameters crossing at right angles to each other, as shown in FIG. 15, whereupon all the rotors 112 through 115 vigorously rotated toward the center of the resonator 111 as shown in arrow marks in FIG. 15.

Figure 16:
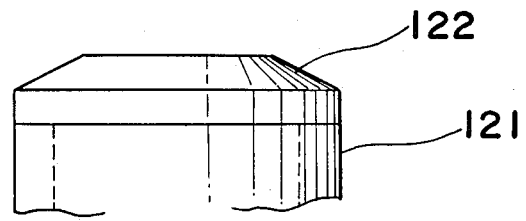
FIG. 16 is a schematic diagram showing a way of operation of the vibrator according to the present invention.
Figure 17:
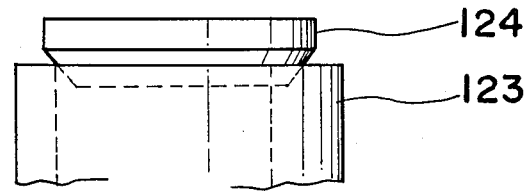
FIG. 17 is a schematic diagram showing another way of operation of the vibrator according to the present invention.

In Examples 25, 27, and 29, as shown in FIG. 16, when the disk 122 having a trapezoid cross section was placed on the end face of the cylindrical torsional resonator 121, the disk 122 smoothly rotated. Against this, in Examples 13, 18, 22, 23, 26, 28, and 30, as shown in FIG. 16, the disk 122 did not rotated, but when, as shown in FIG. 17, the disk 124 having a reverse trapezoid cross-sectional shape was set, vigorous rotation occurred in all of the Examples listed in the table. The one which rotated most vigorously was Example 30. The exciting frequencies for them are shown respectively in the table. In these cases, the portions of contact between the resonator 123 and the disk 124 were only on the circumferential line at the inner circumferential angle part of the resonator 123, so that it is presumed that the surface of the resonator 123 made elliptical movement along this line.

Figure 18:
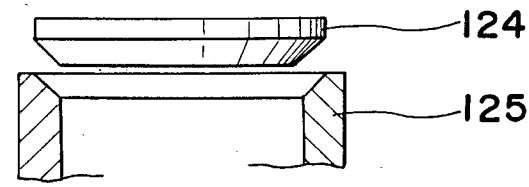
FIG. 18 is a schematic diagram showing a further way of operation of the vibrator according to the present invention.

In Example 20, considering that no large torque would be apt to be sustained by a linear contact, chamfering was made along the angle on the inner circumferential side of the cylindrical torsional resonator 125 as shown in FIG. 18. In that case, it required special notice because the conditions of resonance changed. In any case, in Example 20, a disk 124 having a reverse trapezoid cross-sectional shape was allowed to be in tight contact with the chamfered inner circumferential part, whereupon smooth rotation occurred. When the pressure contact force was increased so as to intensify the rotary torque, irregular vibrations occurred and no smooth rotation could be obtained.

Then, when the disk was set as in FIG. 17 in Examples 11, 12, 14, 15, 16, and 19, irregular rattling vibrations occurred, and there was sporadical clockwise and anticlockwise rotations. These were the cases where, in Type A, the torsional resonator was made 60 mm in outer diameter, 46 mm in inner diameter, and 7 mm in wall thickness, with the length of the bolt to be 45-50 mm, being the conditions which are hard to provide the stabilized torsion bend wave, and presumed to be the condition of the reverse phase progressive waves being in conflict.

Figure 19:
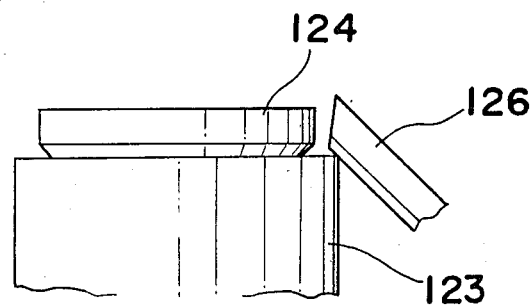
FIG. 19 is a schematic diagram showing a still further way of operation of the vibrator according to the present invention.

Example 10 is presumed to be the result of change into the bending vibration of the shaft because of the long length of the cylinder. By the way, in these vibrators, when, as shown in FIG. 19, under the set state of the disk 124, the knife 126 is pressed in a manner to cut in onto the periphery of the outer circumference of the cylindrical torsional resonator 123, the disk 124 rotates clockwise or anticlockwise, depending on the spot of pressing the knife 126. That is to say, when anticlockwise rotation is desired, the knife 126 may be applied to a specified portion, and when clockwise rotation is desired, the knife 126 may be applied to another specified portion. Thus, by selecting the place for pressing the knife 126, rotation can be made in an optional direction of either clockwise or anticlockwise, with strong rotary force. Especially, in Example 16, both clockwise and anticlockwise rotations showed the strongest force. The occurrence of rotations on setting the disk 124 onto these vibrators is presumed to be due to the fact that by pressing the knife 126 one of the travelling waves of reverse phases to each other which had been in conflict in the torsion resonator 123 disappears or dwindles, and the disk 124 is presumed to rotate by the survived travelling wave.

Figure 20:
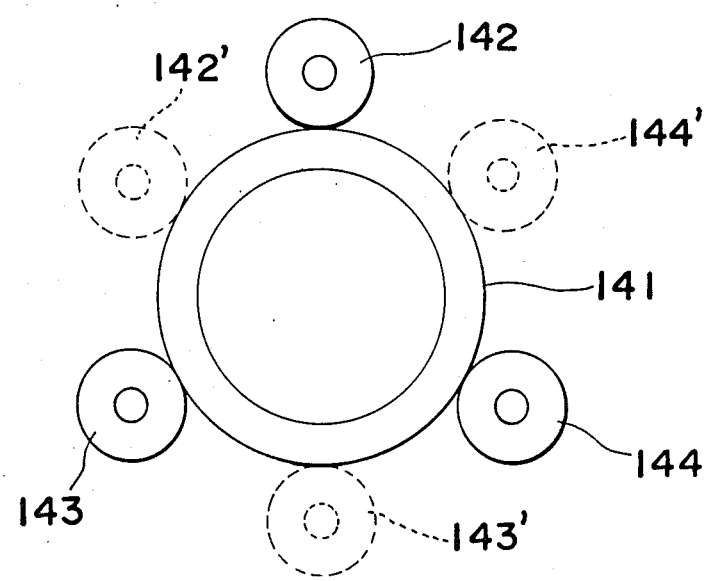
FIG. 20 is a schematic diagram showing a still further way of operation of the vibrator according to the present invention.
Figure 21:
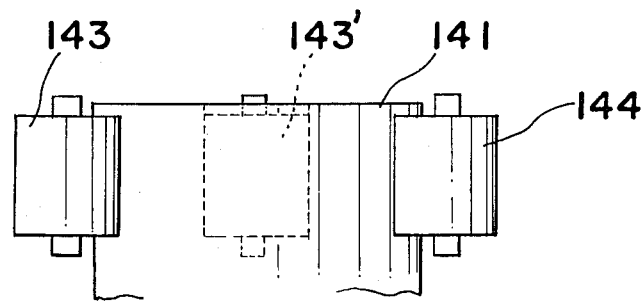
FIG. 21 is a side view of FIG. 20.

Example 24 is a typical example in which the rotor can be rotated on the outer circumferential part of the torsional resonator. As shown in FIGS. 20 and 21, when the shafts of the rotors 141, 143, and 144 are set in parallel with the shaft of the cylindrical torsional resonator 141 and the rotor surface is brought into contact with the outer periphery of the torsional resonator 141, the rotors 142-144 rotate. Though the force of rotation differs by the position of contact, the weakest position which does not cause rotation is on the six-divisional line of the outer periphery along the outer periphery. Between these sectional lines the base portions which show the strongest rotation exist at the angle of 60 degree distance to one another. As the rotations of the rotors 141-144 are reversed relative to each other on the two sides of the sectional line, the lines of the base portions which show the same rotation are at the angle of 120 degrees to one another.

Now, when the three rotors 141, 142, and 144 are fixed in pressure contact at these base lines as shown in FIG. 20, all the three rotors 141-144 vigorously rotated in the same direction. Then, when all the rotors 141, 143, and 144 are moved to the positions distant by 60 degrees, because these positions were just the bases of reverse phase, the rotors 142', 143', and 144' vigorously rotated in the reversed direction.

It is known from the above that on the cylindrical surface of the cylindrical torsional resonator 141 the standing waves of wave number n−3 in torsional bending mode are produced, and on the 6 bases distant by half wavelength each, ultrasonic vibrations wherein the locus of the base line becomes elliptical motion. This torsional resonator 14 has an outer diameter of 50 mm and an inner diameter of 36 mm, and the wavelength of the standing wave of n−3 is of a length close to 37.7 mm which is a three equal division of the inner periphery. Since the two ends of the beam of 7 mm in thickness and 1 in length are fixed and the value of 1 which resonates at 26.4 KHz is 38 mm, there is seen a weak agreement with the above value of 37.7 mm. In the cylinder of 60 mm in outer diameter and 36 mm in inner diameter, a standing wave of n−4 is produced at about 32 KHz as in Example 22, said wavelength of $2r/4=36$ mm nearly agrees with the resonating wavelength of 34 mm at the two-end fixed beam of 32 KHz.

Figure 13:
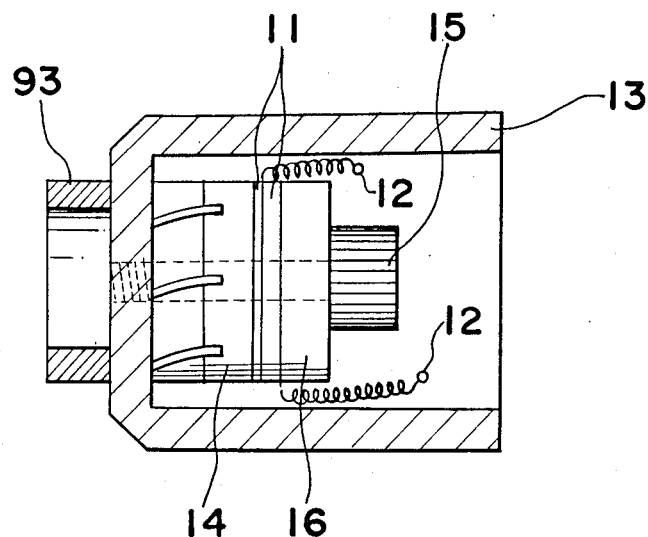
FIG. 13 is a cross sectional view showing a still further modification of a vibrator according to the present invention.

While omitting to list in the table shown in the embodiment of the present invention, there are conceivable various modifications based on these. For example, FIG. 13 shows one provided on the outer bottom part of the resonator 13 of FIG. 5 with a ring-form projection 93. When a rotor was placed on the ring 93 in the same manner as in FIG. 9, the rotor turned slowly with strength even when the torsional resonator of the same size as that of Examples 11 to 16 was used.

Figure 14:
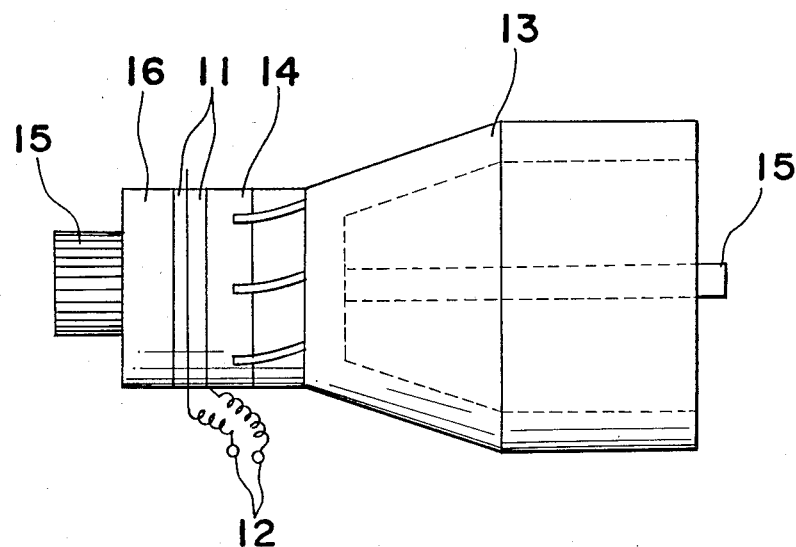
FIG. 14 is a front view showing a still further modification of the vibrator according to the present invention.

FIG. 14 is a modification wherein the bolt 15 of the vibrator of FIG. 4 is elongated. When a disk is set on this bolt 25, the disk smoothly rotates. These are only few examples of mere modifications utilizing the effect that in the ultrasonic vibration of torsional bending mode combined type of the present invention a ultrasonic elliptical circular vibration occurs. Therefore, other examples are omitted.

The ultrasonic vibrator can provide various modes of elliptical vibrations on various surfaces of the resonator, e.g., lateral side, end surface, inner lateral surface, inner bottom surface, and outer bottom surface, and further on the contact lines of these surfaces by varying the conditions of diameter and wall thickness to the length of the torsional resonator of the said cylinder, so that it has the best suitable use as a vibrator of an ultrasonic motor, and its effect to complement the defective technique and unavailable technique is large.

Then, examples of the torsional mode ultrasonic vibrator made by connecting in one-piece the piezoelectric thickness vibrator, longitudinal mode resonator, torsion coupler, and torsional mode resonator, are explained according to the drawings.

Example 31

Example 22 shows one embodiment of the torsional mode ultrasonic vibrator of the present invention. The parts $1_1$, $1_2$ are the donut shaped thickness vibrators comprising a $Pb(ZrTi)O_3$ piezoelectric ceramic with the thickness of 2 mm, inner diameter of 15 mm, outer diameter of 35 mm, being provided with depoling treatments by coating the silver electrodes on the two surfaces. The (+) poled electrodes of two resonators $1_1$ and $1_2$ are set opposite to each other, between which a donut shaped phosphor bronze plate 9 having a thickness of 0.2 mm, inner diameter of 15 mm, and outer diameter of 35 mm are held.

Onto these thickness vibrators $1_1$ and $1_2$ a cylindrical aluminium vertical mode resonator 2 (outer diameter 35 mm, inner diameter 15 mm, thickness 20 mm), a torsion coupler 3 comprising eight torsion teeth on the peripheral surface near one opening of cylindrical aluminium pipe (outer diameter 353 mm, inner diameter 17 mm, thickness 13 mm), and a torsional resonator 4 (lower face diameter 50 mm, height 55 mm, and wall thickness 7 mm) were laid. To the other lateral side of the piezoelectric thickness vibrator $1_1$ a stainless steel washer 5 (outer diameter 35 mm, height 15 mm) was applied in contact, into the central hole thereof a hexagonal cap bolt 6 (diameter 10 mm, length 65 mm) was positioned and screwed into the screw hole provided at the center of the upper face of the torsional resonator 4, and the bolt 6 was tightened with a torque of about 200 kg-cm, by which a torsional mode ultrasonic vibrator made by connecting all the above parts in one-piece was assembled.

In order to excite the vibrators $1_1$ and $1_2$, to the lead wires 7; 8 soldered onto the phosphor bronze terminal plates $9_1$ and $9_2$ a high frequency voltage in the vicinity of 30 KHz and it is lead to a resonating condition while adjusting the frequency, by which a torsional mode vibration occurs on the outer end face of the torsional resonator 4. That is to say, the end face shrinks and/or stretches in the lengthwise direction of the bolt 6 and shows an elliptical vibration 10 made by synthesizing the torsional vibration on the rotary axis of the bolt 6. Of course, the main axis of this ellipse lies in the cylinder surface coaxial with the circumferential surface of the torsion resonator 4.

In this torsional mode ultrasonic vibrator, the torsion coupler which is designed to change the thickness longitudinal vibration into the torsion vibration can be made by the method as shown in FIG. 2.

Firstly, as shown in FIG. 23 (a), two cylinders 12 and 14 are combined with 8 plates 13 arranged radially, wherein the cylinders 12 and 14 each have an outer diameter of 35 mm, inner diameter of 17 mm, and length of 12 mm, and the plate has a width of 8 mm, length of 16.5 mm, and a thickness of 2 mm. Eight plates 13 are radially arranged as in (b) in the same manner and the two cylinders 12, 14 and the plates 13 are made into one-piece. Then, when the cylinders 12 and 14 are subjected to torsional deformation around the central axis, a shape of (c) in the said Figure is obtainable. Thereafter, when the resulting product is cut into two parts along the central surface, a torsion coupler provided with radial teeth at the end face of the cylinder 12 as shown in said FIG. (d) is produced. The torsion coupler is an element which shows a torsion deflection around the axis on receiving a compression force in an axial direction and converts the longitudinal vibration to the torsion swing. The torsional resonator 4 is an provided to resonate with the torsional vibration of the pipe under the torsional torque of the torsion coupler 3 and to amplify the torsional vibration width. The resonance frequency is determined by the length of the pipe. In this embodiment, as a pipe of 65 mm length was used, resonance took place at 31.5 KHz.

When a torsional mode ultrasonic vibrator is assembled by combining these parts, a shape as shown in FIG. 1 is obtained. When a sine wave voltage of 31.5 KHz, about 10 volts is applied across the lead wires 7 and 8, an elliptical vibration having the end face as shown in the arrow mark 20 is generated. The same results are obtainable either by combining the longitudinal vibrator 2 and the torsion resonator 3 into one-piece or by combining the torsion resonator 4 and the torsion tooth 13 into one-piece. In the above Example, the number of the plates of the torsion tooth 13 has been set as 8, but the number is not necessarily limited to 8 but optimum number may be selected according to the plate thickness and length in view of the balance of strengths between the torsional deformation and compressional deformation.

Example 32

Figure 24:
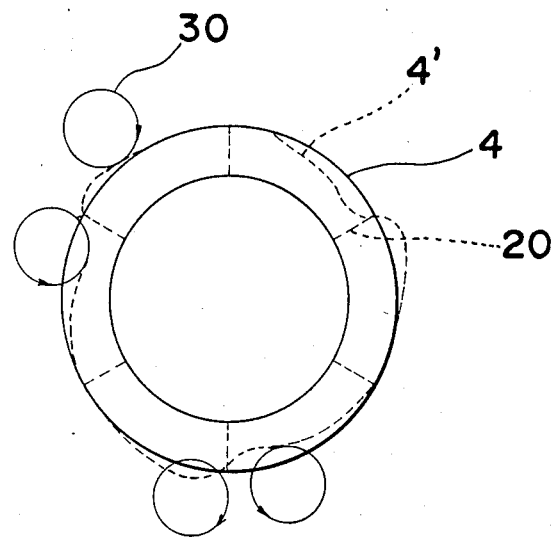
FIG. 24 is a schematic diagram showing the motion of the vibrator at the end face of the torsional mode ultrasonic vibrator according to the present invention.
Figure 25:
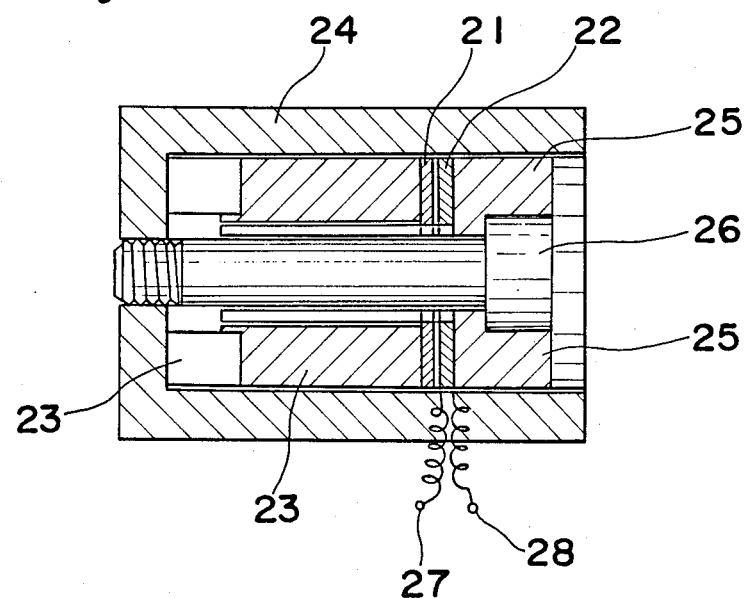
FIG. 25 is a cross sectional view showing a further modification of the vibrator according to the present invention.

A torsional mode ultrasonic vibrator having the entirely same torsion mode as in the case of Example 31 with only the exception being the height of the torsion resonator 4 being 65 mm which is different from that (55 mm) of Example 31 was constructed, which was energized with a sine wave voltage at 26.4 KHz, upon which, as shown in FIG. 24, there was produced a bending vibration 4' having a distortion of the tertiary spreading mode of the cylindrical surface near the end face of the resonator 4, as shown in FIG. 24. The sections 20 of the vibration appeared every 60° along the periphery of the cylinder at six equal divisions, each section showing reverse phase of vibration, so that they are presumed to be the standing waves of wave number n=3. Since the positions of the section and the base were constant, they might be the standing waves, but due probably to the distortion, the base was not at the middle point between the sections but near one section, and the wave showed an elliptical motion 30.

As a result, when the rotary shaft of the cylindrical rotor was brought into pressure contact in parallel with the shaft of the torsion resonator, the element rotates at a fairly high speed, but when the position of the contact line between the rotor and the resonator was shifted along the circumference of the resonator, the element rotates reversely at every 60°.

As explained above, according to the torsion mode ultrasonic vibrator of the invention, it is possible to cause an elliptical vibration at a fixed position of of the torsional resonator. Since the wave number of the elliptical vibration varies by the diameter of the resonator and the wall thickness of the resonator, optional designing is feasible.

Example 33

While explanations have been made by exemplifying in Examples 31 and 32 on the twist mode ultrasonic vibrator of the invention, in order to generate a strong torsional mode, it is necessary to amplify the amplitude with a resonator. Since the frequency of the torsional resonance is determined by the length of the pipe, it is not possible to use a pipe shorter than the designated length to obtain the necessary vibration. This is disadvantage for miniaturing the vibrator. A more compact torsional vibrator without this disadvantage is shown in FIG. 23.

The torsional vibrator 24 is a cylinder having the outer diameter of 55 mm, inner diameter of 41 mm, and length of 75 mm, with one end opened and the other end provided with a bottom of 7 mm in thickness. Onto the inner surface of this bottom, a torsion coupling 23 integrated with the vertical vibrator, piezoelectric ceramic vibrators 21, 22, and a stainless steel washer 25 were assembled, and were strongly fastened to the inner surface of the resonator 24 through the cap bolt 26. The elements 27 and 28 are the lead wires. The thus produced torsional mode ultrasonic vibrator performs the same functions as the vibrator as shown in FIG. 22 but its length can be shortened to about half and be useful for miniaturization.

The torsional mode ultrasonic vibrator as explained above is operable for the vibrations of the following three modes: (1) to have the end face of the vibrator effect torsion vibration uniformly and coaxial with the axis of the resonator, (2) to couple the torsion with a longitudinal and vertical vibration so as to effect not a simple torsion but to have the end face make an elliptical vibration, however, the rotary shaft of the ellipse being a radial direction within the surface perpendicular to the torsion axis, and (3) to produce a standing wave of wave number n on the resonator and to have it make elliptical vibration of reverse phases to the adjacent parts on division of the periphery of the cylinder into 2n, however, the rotary shaft of the ellipse being parallel with the torsion shaft.

While the above are the basic modes, when these are combined, complicated asymmetric vibrations occur such that for example an elliptical vibration made on the rotary axis of the contact line of the end face and the outer peripheral surface of the resonator with the cylindrical surface in the partial cross-sectional surface of the cylinder.

As explained above, due to the integral combination of the piezoelectric thickness vibrator, vertical mode resonator, torsion coupling, and torsional mode resonator, it is possible to realize a compact, new functional ultrasonic torsional vibrator which generates strong torsion vibration with good efficiency. As the component is composed in one-piece, it is convenient for use and has an effect of being made into miniature size.

When the torsional mode ultrasonic vibrator of the present invention is utilized in a piezoelectric motor, it is possible to take a broad frictional contact face, so that the friction can be lessened. When the rotor is brought into contact with the outer periphery of the cylindrical vibrator and allowed to make sliding rotation therewith, it is possible to constitute a motor capable of making reverse rotation by sliding the position of contact by a half wavelength. Alternatively, it is possible to have a flat plate or a bar brought into contact and move linearly in one direction.

Other examples of the motors using the torsional mode ultrasonic vibration according to the present invention are given below.

Example 34

Figure 26:
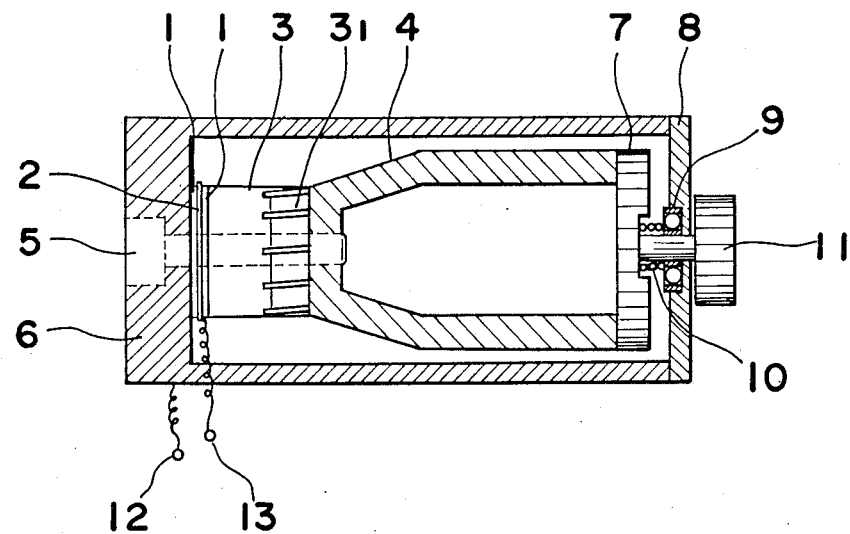
FIG. 26 is a cross sectional view showing one embodiment of a torsional mode piezoelectric motor according to the present invention.
Figure 27:
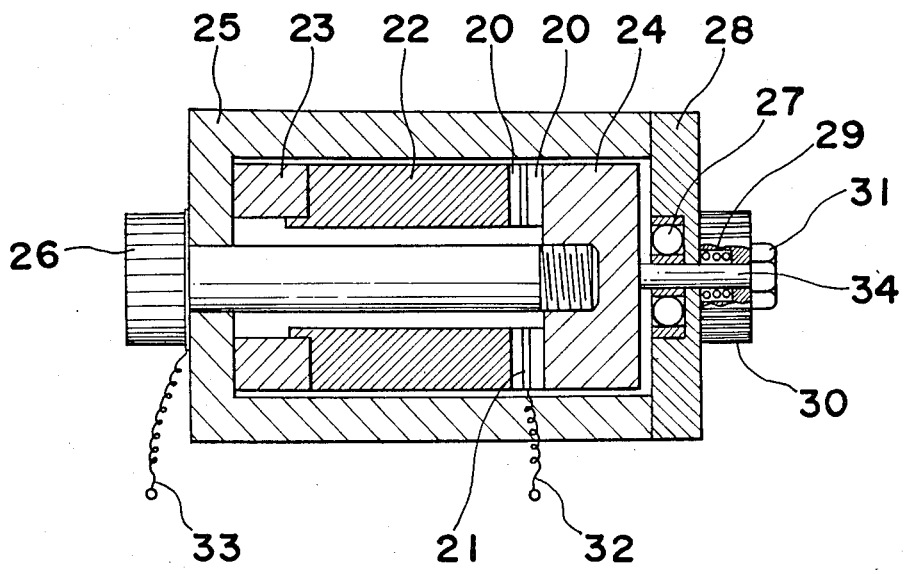
FIG. 27 is a cross sectional view showing another embodiment of a torsional mode piezoelectric motor according to the present invention.

In FIG. 26 there is shown an embodiment of the torsional mode driving piezoelectric motor of the present invention. In the figure, 1 indicates two thickness vibrators each comprising a donut shaped piezoelectric ceramic of Pb(ZrTi)O$_3$ (outer diameter 35 mm, inner diameter 15 mm, and thickness 2 mm). Into the space formed by piling up the two positively polarized surfaces in a face to face mode, a phosphor bronze terminal plate 2 having the outer diameter 35 mm, inner diameter 15 mm, and thickness 0.1 mm was inserted. On the peripheral surface near the one opening end of an aluminium cylinder having the outer diameter of 35 mm, inner diameter of 11 mm, and thickness of 15 mm, 8 grooves of 3 mm in depth and 2 mm in width were provided radially. Into these grooves 8 plates of 2 mm in thickness, 7 mm in width, and 11 mm in height were respectively vertically inserted and fastened, and, making the axis of the aluminium cylinder as a rotary axis, the tips of the 8 tooth-shaped plates were deformed by torsion to constitute a torsion coupling 3. And, the end face of the tooth-like plate 3$_1$ as deformed above is brought into direct contact with the bottom face of the torsional resonator 4. The torsion resonator 4 should be of a bottomed cylinder, having a function to resonate at its trunk the torsional vibration exerted to the bottom face, and, aside from the diameter and wall thickness of the cylinder, the length of the cylinder is important in determining the resonance frequency. In this embodiment, a trapezoidal cylinder having a trunk length of 70 mm, outer diameter at the front end of 50 mm, and inner diameter of 36 mm is employed as a torsional resonator 4.

On the above described torsional resonator 4, the torsion coupling 3, thickness vibrator 1, and terminal plate 2 were piled up, and they were contained in a cylindrical motor case 6. From the bottom part, a cap bolt 5 of 20 mm in diameter and 40 mm in length was inserted into the screw hole at the bottom of the torsional resonator 4 and tightened with a force of 150 Kg.cm by means of a torque wrench. In this manner a stator for the torsional mode driven piezoelectric motor was completed.

The rotor 7 comprises an aluminium disk of 50 mm in diameter and 10 mm in thickness and a rotary shaft of 10 mm in diameter and 20 mm in length provided to protrude from the center thereof. A coil spring 10 was accommodated in the above rotary shaft to make it an inner retainer for the ball bearing 9 positioned in the center of the lid 8 of the motor case 6, and after screw stopping the output gear 11 to the front end of the shaft, it was stopped with a pin. When the lid 8 was fixed to the case 6 with a screw, the face of the rotor 7 was fixed under contact pressure to the end face of the torsional resonator 4. By applying the lead wires 12 and 13 to the assembled motor and applying the sine wave voltage of about 10 volts and 24.5 KHz, the rotor 7 strongly rotates to provide a rotary output from the front end gear. The motor rotation is quiet at several cycles a second, but when the frequency is slightly changed, irregular rotation occurs. If the frequency varies by about 10%, the motor rotation stops. Therefore, control of frequency is important. Further, if the periphery of the cylinder of the resonator 4 is touched by hand and the like, Q value of the resonance decreases to stop rotation. Accordingly, it may be effective to provide a brake of a type to apply a hard rubber lightly along the circumference.

If it is designed to make the electric high frequency input for operating the motor selectable between two slightly different frequencies, normal and reverse directional rotations can be obtained.

Example 35

In the torsional mode driven piezoelectric motor of the present invention, the torsion resonator performs the most important function. The length of the resonator L, can be given by the equation:

$$L = 1/(2f) \times \sqrt{G/\rho}$$

wherein
f = resonance frequency
G = shearing modulas
ρ = density which is in the order of 80 mm to 20 KHz and 40 mm to 39 KHz. When the length is shorter than 40 mm, the amplitude of the torsional vibration becomes smaller, so that it is suitable for the length L to be 50 mm or more, and the frequency to be not more than 35 KHz. As there is a tendency for the resonator to become long, there is an apprehension for the whole length of the piezoelectric motor to become long. An embodiment which has resolved the above point is given below.

The arrangement of the respective parts is nearly the same as that of Example 35. The thickness vibrator 20 is laid with the torsion coupling 22 and the washer 24, and they are strongly tightened with a cap bolt 26 inside the cylindrical torsional resonator 25 to fixedly combine them in one-piece. As the torsion coupling 22 uses the longitudinal vibrator as a trunk to the tooth-like plate 23 thereof as in Example 34, the length is set as 35 mm so as to make the longitudinal resonant frequency close to the torsion resonance. The torsion resonator 25 is excited in the torsion vibration with the tooth-like plate 23 of the coupling 22 tightened with a bolt to the bottom face, and when resonance occurs at the trunk part, a large amplitude occurs on the front end free surface.

When a rotor 28 is fixed under pressure to the front end surface, the rotor rotates. As to the pressure contact method, the ball bearing 27 of the rotor 28 is led through the center shaft 34 of the washer 24, a coil spring 29 is interposed, and the elements are fixed with the nut 31. The output gear 30 is made by one-piece processing with the rotor 28. According to this method, the size of the torsional mode-driving piezoelectric motor could be shortened to about ⅔ of the length of that in the Example 34. The resonator of the torsional mode-driven piezoelectric motor of the present invention requires that it be designed to such a size as can excite only the torsional mode and the vertical mode without allowing any other mode such as a bending mode to be produced. When the design is made with the inclusion of the longitudinal vibrator, by slightly modifying the energizing frequency, the motor can be rotated in the reverse direction.

As explained above, the Example 35 of the present invention has a construction that, in a piezoelectric motor utilizing the rotary torque generated by the ultrasonic vibration induced between the contact surface of the rotor and the stator which are in pressure contact with each other, there is used as a rotary torque source by ultrasonic vibration a torsional mode ultrasonic vibrator made by one-piece construction of a piezoelectric thickness vibrator, a torsion coupling, and a torsional mode resonator and it is possible to make the pressure contact between the rotor and the stator a surface contact. Thus, it has been possible to alleviate the pressure contact force per unit area and accordingly to prevent abrasion of the sliding movement surface. Further, the facility to make reverse rotation by changing the energizing frequency is an advantage which is impossible with a "woodpecker type". Although the reverse rotation is feasible with "surface acoustic wave type motor", compared with the necessity to use simultaneously the two high frequency wave inputs which are different in phases by 90° while being the same frequency, the reverse rotation method of the torsion mode driving piezoelectric motor is simple.

Example 36

Figure 28:
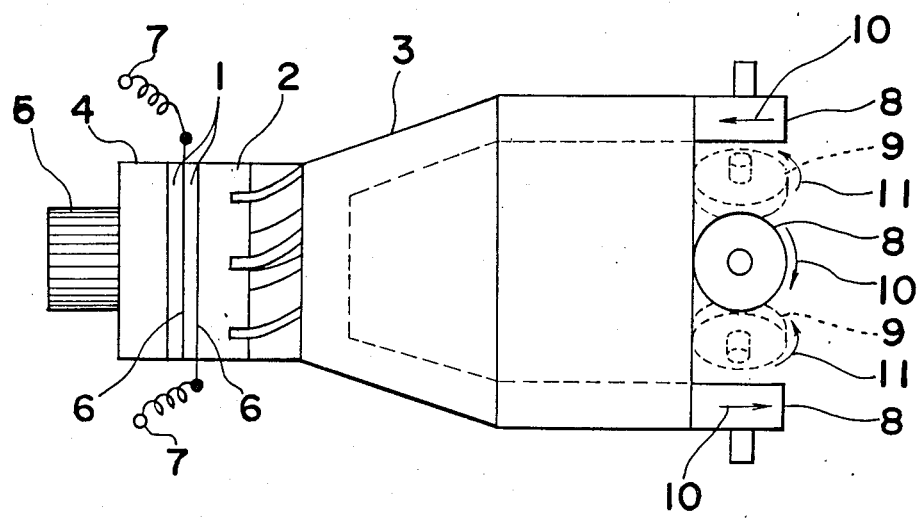
FIG. 28 is a schematic diagram showing a principle of a piezoelectric motor using standing waves according to the present invention.
Figure 29:
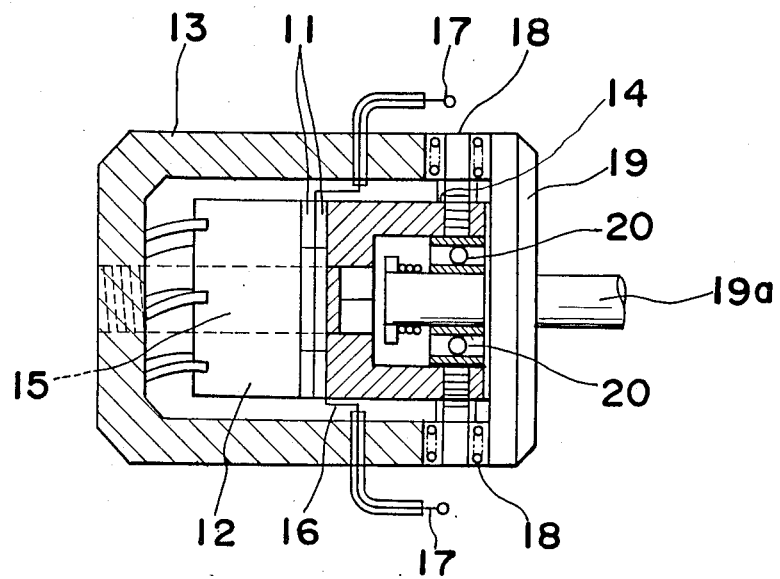
FIGS. 29 through 31 are cross sectional views of embodiments of the piezoelectric motor according to the present invention.

FIG. 28 shows another embodiment of the present invention. In the figure, 1 to 7 show the parts to constitute the torsional bending mode combined type ultrasonic vibrator, and 8 to 11 the parts to constitute the rotor. That is to say, the torsional bending mode combined type vibrator is a means, by tightening the piezoelectric thickness vibrator 1, torsion coupling 2, and torsional resonator 3 with a bolt 5 to make them into one-piece. And, to the lead wire connected between the piezoelectric resonator 1 and the multi-layered terminal plate 6, a high frequency electric signal is applied to have the resonator 1 vibrate. With this torsion tooth-like plate to which the thickness vibration is applied, the torsional resonator is excited to bring the cylinder to a torsional resonance state.

At this time, the cylinder is apt to sustain a lengthwise bending vibration, and the open end face of the cylinder is deformed from the true circle to polygonal shape. This tendency is eminent when the relations between the diameter, height, and wall thickness of the cylinder of torsional resonator are selected so as to meet the conditions under which the torsional mode and the bending mode are combined, when there arises a standing wave of wave number n.

For example, in case of the resonator having the outer diameter of 60 mm, inner diameter of 46 mm, and height of 55 mm, a standing wave of wave number n=4 is generated when excited under the sine wave voltage of 31.94 KHz. When the rotary face of the rotor 8 is fixed under pressure contact as shown in FIG. 28 along the circumference of the open end face of the resonator, the rotor 8 rotates. the position where the rotation of the rotor 8 becomes most vigorous is the place distant by 45 degrees to each other, being the base part of the standing wave. At the intermediate portion of these eight base parts there are the sections of vibration. When the rotor 8 is fixed under pressure contact there, the rotor 8 does not rotate. The rotor 8 which is fixed under pressure to the base part on the right side of each section is rotated clockwise (as shown in arrow mark 10), but the rotor 9 fixed under pressure contact to the left side base is rotated anticlockwise (as shown in arrow mark 11). In other words, when the rotary faces of 4 rotors in which the rotary shafts are radially arranged in a manner to cross at right angles to each other in the direction of the diameter of the resonator are fixed under pressure to the base parts of vibration of the end faces of the resonator, all the four rotors rotate in the same direction.

One device made by applying this principle is the piezoelectric motor as shown in FIG. 2, wherein the piezoelectric vibrator 11, torsion coupling 12, torsional resonator 13, and washer 14 are tightened with a bolt 15. Ball bearings 18 are set to the rotary shafts radially projected at right angles toward four directions from the upper part of the washer 14, and under the condition of the disk-like rotor 19 being fixed under pressure to these four bearings, the bearing 20 accommodated to the rotary shaft 19a was screw stopped with the rotary shaft of the bearing for the rotor. In the piezoelectric motor constituted as the above, when a sine wave voltage of 32 KHz was applied to the lead wire 17, the rotor shaft 19 started to rotate, and reached the revolution of 300 rpm under the voltage of 50 volts.

Example 37

In Example 36, there could be obtained only one directional rotary output at a time. In Example 37 there is shown an example where the reverse rotation outputs of clockwise and anticlockwise directions were simultaneously obtained by the use of the two coaxial shafts.

Figure 30:
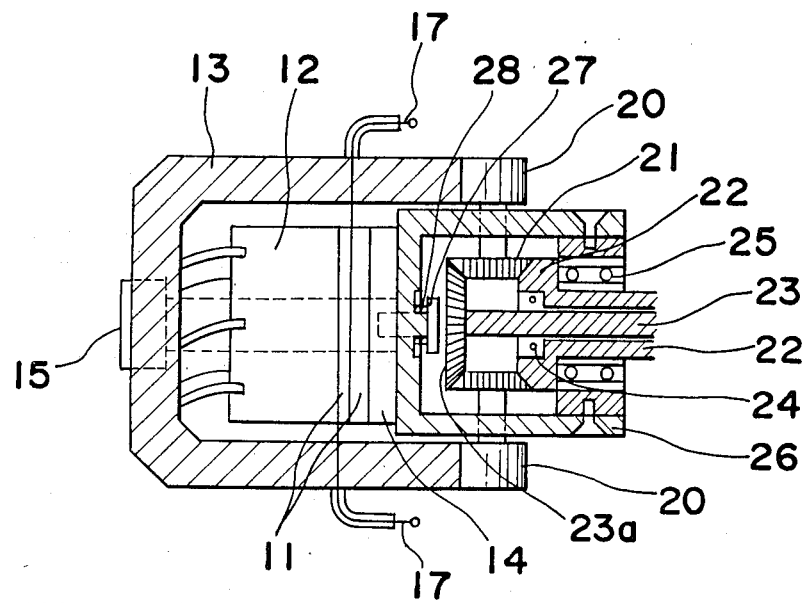

As shown in FIG. 30, the basic constitution of the vibrator is the same as that of FIG. 2, so that the explanation thereon is omitted. Its difference from Example 1 is that the output shafts 22 and 23 are set to the gear box 26, and, by means of the gear 21 engaged with the umbrella type gear 2a which is vertically engaged with the shaft 23 at its end, the rotary torque of the rotor 20 which is integrated with the rotary shaft can be taken out.

The four rotors 20 are projected in four directions from the cylindrical surface of the gear box 26, and the rotary shafts are fixed to the gear box 26 by means of the bearings. The gear box 26 is fastened to the washer 14 by means of the coil spring 28 led through the bolt 27 of 4 mm diameter at the front end of the bolt 15, because of which the rotor 20 is to be fixed under pressure contact to the end face of the vibrator 13.

When the vibrator is excited and ultrasonic elliptical vibration of wave number 4 is generated at the end face, the four rotors 20 which are arranged at right angle crossing relations unanimously rotate in the same direction to give the reverse rotation outputs from the shafts 22 and 23. Although the illustration was omitted due to non-necessity, it is possible to obtain the same rotary output or to obtain the two mutually reverse axial outputs by using a gear box in which 8 rotors are positioned in 8 radial directions at the angle of 45° each. In order to obtain the same rotary output, the umbrella shaped gears 21 to be fixed to the rotors 20 should be so set as to be in reverse directions to the adjacent two rotors. As the construction was so made that the inside facing gear should be engaged with the umbrella shaped gear of the inside shaft 23 and the outside facing gear with the umbrella shaped gear of the outside shaft 22, the shaft 23 rotated slowly and the shaft 22 rapidly, both in the same direction. It was possible to make the two shafts in one-piece by varying the teeth of the gear and to output strong rotary torque.

Example 38

Figure 31:
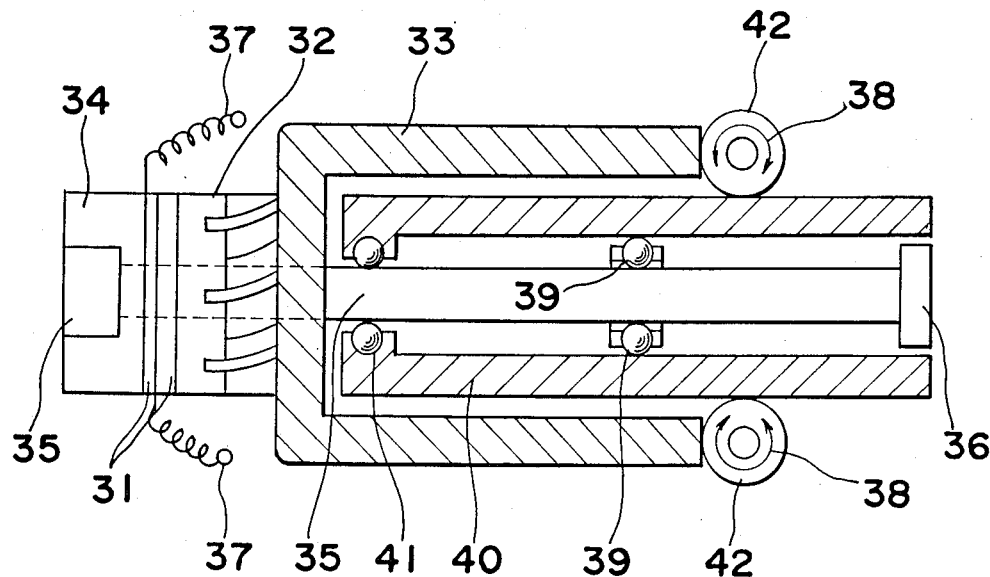
Figure 32:
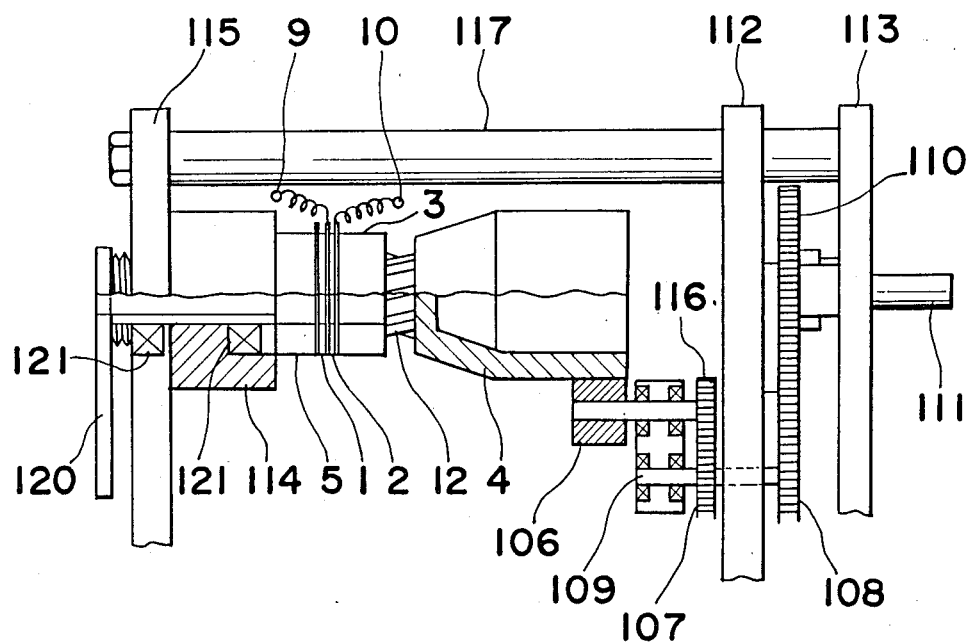
FIG. 32 is a partial cross sectional view showing the detail of an example of a piezoelectric motor of the torsional vibrator peripheral surface driving type according to the present invention.

FIG. 31 shows an embodiment of the linear motor in which the pipe 40 is led in or out. While it is the same as in the foregoing embodiments that a ultrasonic elliptical vibration is produced at the end face of the torsional bending vibrator and it is employed as the driving source for the motor, the length of the cylinder 33 of the torsion resonator was made 65 mm. The four rotors 42 were arranged so that their directions of rotation cross at right angles to each other as shown in FIG. 31, and were fixed under pressure contact to the end face of the cylinder 33. The tightening bolt 35 is provided with 10 mm screw threads at its base part of 30 mm, and the portion beyond that part is in a round bar of 8 mm in diameter. At the further end area of 5 mm, a 8 mm thread is provided, with which the stopper 36 is stopped by screwing. Into this, a pipe 40 (outer diameter 35 mm, inner diameter 20 mm, and length 100 mm) was led, and a ball 39 was inserted to set therein. At one end of the pipe 40 a ball bearing 41 is set. The vibrator resonated at 31.44 KHz and 32.13 KHz, and as the rotor 42 showed a reverse rotation, the pipe 40 could be moved back and forth at a stroke of 80 mm.

As explained above, the present invention has such a construction that an ultrasonic standing wave in which the locus of the base of vibration shows an elliptical motion is generated in at least one of the moving element and the stator which are fixed under pressure via the rotor, and the contact position of the above mentioned rotor is held at all times at the position of the base of vibration. Accordingly, the present invention has advantageous effects such that it is possible to output monodirectional rotation, or to output simultaneously the mutually reverse two rotations, or to have the moving element linearly move back and forth, or further to make reversible rotation by changing the exciting frequency, thus making it possible to diversify according to the desired use. Especially, in the construction of directly fixing under pressure the moving element to the stator, it was the problem that when the pressure contact force is enlarged to obtain a large output the sliding surface causes wear. However, it was possible to reduce wear by intervening a rotor.

The expression "moving element and stator which are fixed under pressure via a rotor" naturally covers the case where the moving element and the stator are fixed under pressure in opposite state as shown in FIG. 2, the case where the the pressure contact surfaces of the moving element and the stator with the rotor are crossing at right angles to each other as shown in FIG.

4, and the case where, as shown in FIG. 3, the gear-like rotor at the front end of the rotary shaft is connected with the rotor through the umbrella shaped gear and the rotor is fixed under pressure to the stator which forms the end face of vibration.

Example 39

According to the piezoelectric motor of the torsional vibrator peripheral surface driving type of the present invention, when the rotary shaft of the rotor is kept in parallel with the shaft of the torsional resonator 4 and it is fixed under pressure to the base parts of vibration of the torsion vibrator 4 from the outer peripheral surface or the inner peripheral surface, a large torque is obtainable. Further, when the pressure contact position of the rotor is moved to the adjacent base part, the rotor shows reverse rotation. Under the size of the ultrasonic vibrator of the torsion mode used in Example 1, the wave number of the bend wave to be combined with the torsion vibration was 3, so that the numbers of the base and the section of vibration were respectively 6.

In this embodiment, by using a torsional mode ultrasonic resonator, 3 aluminium rotors 106 were fixed under pressure to 3 bases taken at every other interval of the 6 bases, and as shown in FIG. 5, these 3 rotors 106 were connected with the central large diameter gear 110 through the gears 116, 107, and 108, and the forces of the three rotors 106 were combined, by which a motor which intensively rotates the main rotary shaft 111 was made on trial. The washer 5 of the torsional mode ultrasonic vibrator was set to the rotation supporting part 114 with which a ball bearing 121 was engaged, and supported by fixing to the supporting plate 115. The rotation supporting part 114 can be turned by about 90 degrees by means of the lever 120. The three rotors 106 are fixed under pressure contact to the three bases which are disposed at 120 degrees to each other and receive strong rotary torque. When the lever 120 was turned by 60 degrees only, the rotor rotated reversely and a large reverse rotation torque could be obtained from the rotary shaft 111.

While the shape of the motor is axially symmetric to the vibrator, because of the complicated rotor structure, FIG. 5 shows a side view for the upper half and an exploded view for the lower half, and yet it shows only one of the three rotors 106. Although the driving force of the rotor 106 is given by the pressure contact force, since too strong force gives rise to suppression of the amplitude of vibration, adequate pressure is necessary. Because of this, the rotor is made freely movable by the arm combined by ball bearing with the shaft 109 fixed to the supporting plate 112, and the torque is transmitted via gears 116 and 107 through the shaft and further the gear 108 to the large diameter gear 110. Accordingly, it is designed that the rotation of the large gear 110 is not affected even by moving the arm to change the pressure contact force of the rotor 106. This means simultaneously that even when the load of the output shaft 111 fluctuates no effect is given to the pressure contact force of the rotor 106.

Though not illustrated here, it is designed, as a method of obtaining the pressure contact force of the rotor to a sufficiently large degree, to prepare three rollers for the inner peripheral surface so that the wall of the pipe of the resonator was strongly clamped with the roller and the rotor, and yet the roller and the rotor were supported under the mutually strongly pulling condition so as to follow lightly the vibration of the pipe.

The thus constituted piezoelectric motor can provide a strong output to the main rotary shaft 111 simply by applying about 20 volts of sine wave voltage of 28.43 KHz to the lead wires 9 and 10, and further, by turning the lever 120 by 60 degrees, it could turn the main rotary shaft 111 instantaneously in reverse direction under preservation of the similar rotary torque.

Since the wavelength of the bending mode vibration is determined by the material quality and thickness of the resonator, it is necessary to process the outer diameter and the inner diameter of the resonator respectively into accurate sizes.

Example 40

Figure 33:
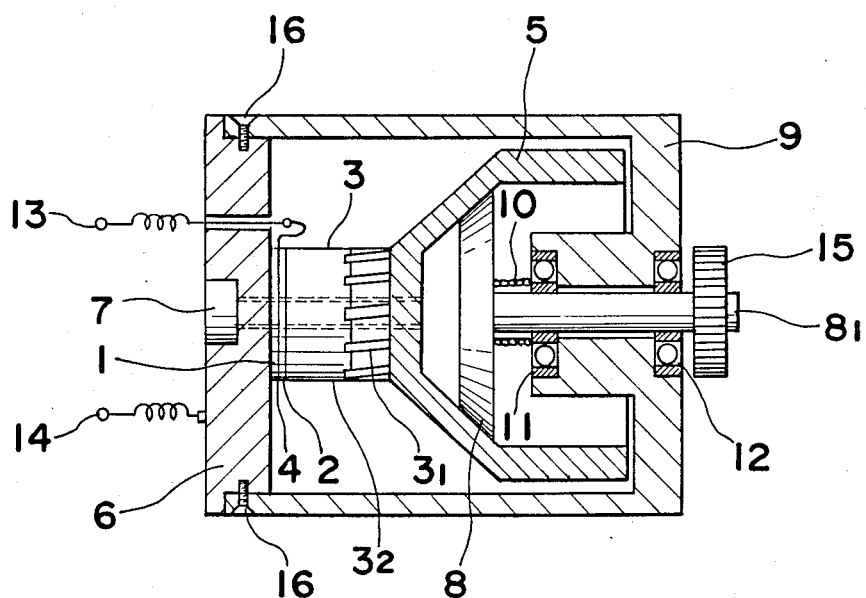
FIG. 33 is a cross sectional view showing a further modification of the piezoelectric motor according to the present invention.

FIG. 33 shows a preferred embodiment of the torsional mode driving piezoelectric motor of the present invention. Between the space formed by placing the two positively polarized surfaces of donut shaped ceramic piezoelectric thickness vibrators 1 and 2 (outer diameter 35 mm, inner diameter 15 mm, and thickness 2 mm) opposite to each other, a terminal plate 4 having a lead wire 13 therebetween is held and placed. On the other hand, the torsion coupler 3 is constituted by an aluminium cylinder $3_2$ (outer diameter 35 mm, inner diameter 11 mm, and thickness 15 mm), 8 tooth-like plates $3_1$. The tooth-like plate $3_1$ is 2 mm in thickness, 6 mm in width, and 8 mm in height, being provided radially and at equal distance to the end face of said cylinder $3_2$, and deformed by torsion centering on the central shaft of the cylinder $3_2$. With the end face on the side on which the tooth-like plate $3_1$ of the cylinder $3_2$ is not projected, the above piezoelectric thickness vibrators 1 and 2 are brought into direct contact.

Further, the front end face of the tooth-like plate $3_1$ of the torsion coupler 3 was laid on the bottom part of the resonator 5, and the cap bolt 7 of 10 mm in diameter thrusting them through the center of the case base plate 6 was tightened to the screw hole at the bottom of the torsional resonator 5. In this manner the part of the torsional mode ultrasonic vibrator is constituted.

The above torsional resonator 5 comprises aluminium 5056 and has a conical shape (outer diameter 100 mm, inner diameter 86 mm, and height 55 mm). The bottom part of the cone is 35 mm in outer diameter and 7 mm in wall thickness. The length of the cylinder part is 35 mm and that of the taper part 20 mm. The rotor 8 to be fixed under pressure to the tapered part on the inner face of the torsion resonator 5 has a rotary shaft $8_1$ of diameter 8 mm and length 65 mm at the center of the disk (outer diameter 85 mm and thickness 5 mm). The pressure contact surface is a surface made by taper cutting the outer circumference of the disk at the same angle as the taper of the torsional resonator 5.

By leading the coil spring 10 for adjusting the pressure contact force into the rotary shaft $8_1$ and further through the two ball bearings 11 and 12 on the case 9, the angle of the pressure contact surface of the rotor 8 was currently maintained. The case 9 was accommodated into the case base plate 6 and the two elements were combined with a fixing screw 16. Into the rotary shaft $8_1$ of the rotor 8 an output gear 15 was inserted and fixed with a pin to assemble a torsional mode piezoelectric motor. On application of a sine wave voltage of 26.81 KHz by 30 volts to the lead wires 13 and 14, the rotary shaft rotated at about 600 rpm to give an output of 3 kg-m/s through the gear 15.

Example 41

Figure 34:
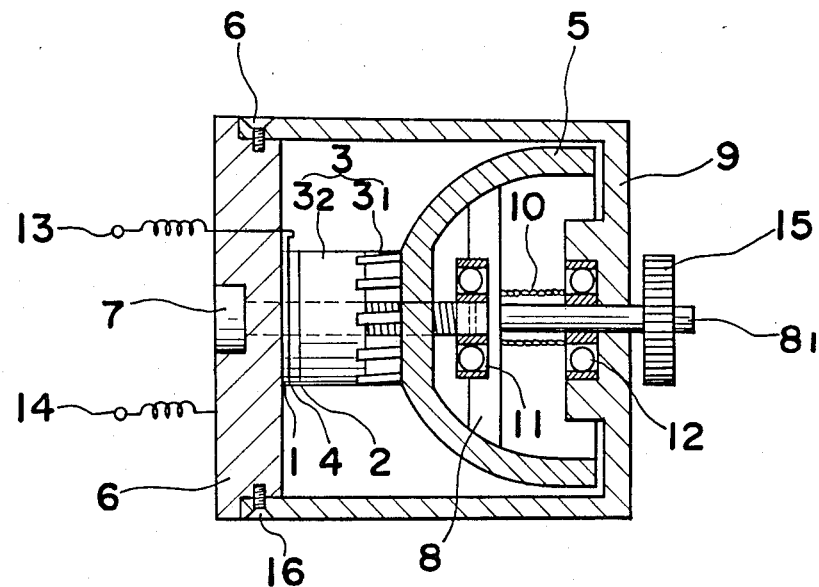
FIG. 34 is a cross sectional view showing a still further modification of the piezoelectric motor according to the present invention.
Figure 35:
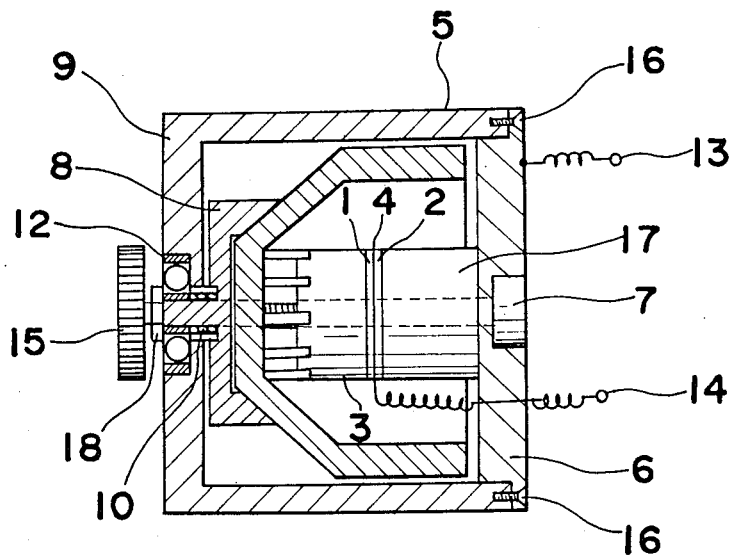
FIG. 35 is a cross sectional view showing a still further modification of the piezoelectric motor according to the present invention.

In order to produce a motor flatter than that of Example 40, the torsional resonator 5 was modified into a cup style, as shown in FIG. 34. In this case, the torsional resonator was made of a stainless steel, and its size was made the same as that of Example 1 with outer diameter of 100 mm and inner diameter of 86 mm. However, owing to the cup style, because the resonating frequency should become slightly lower, the height of the cup was made 50 mm with 5 mm lower than the cone of Example 1 of 55 mm and the torsion coupler 3 the length of 21 mm. Although other parts of the torsion vibrator were the same as those of Example 1, the cap bolt 7 was elongated, and it was led into a ball bearing 11 which was accommodated into the central part of the rotor at the front end so as to provide a fulcrum for the rotary shaft $8_1$. Because of this, the ball bearing 12 of the case 9 sufficed by one. By way of the composite factors of them, the total length was shortened by 15 cm. By applying a high frequency voltage of 28.75 KHz to the lead wires 13 and 14, the rotor 8 vigorously rotated and strong rotary torque could be obtained from the output gear 15.

Example 42

The torsional mode vibrator to be used for the torsional mode driving piezoelectric motor of the present invention has tapered or the curved surfaces on the inner face of the bottom part and the outer face. Therefore, as to the contact of the rotor, the inner surface may be utilized as in the foregoing examples, but the outer side may be utilized. The latter is rather advantageous in making the whole constitution of the motor more compact.

This Example 42 is an example in which the rotor is furnished by outside contact. However, since its basic constituting elements are the same as those of the aforementioned examples and the difference is only in having provided the rotor which had been in inner contact into outer contact, so that only the points of change accompanied thereby will be explained.

First, in order to make the torsion coupler 3 in inner contact with the torsional resonator 5, the length of the washer 17 was made 25 mm, and the torsional mode vibrator was tightened to the case base plate 6 with a bolt 7 with the opening of the torsional mode vibrator 5 underside. The rotor 8 was of a shallow cylindrical shape with its inner face slanted, and provided on the outside of the central part with a rotary shaft. Into this rotary shaft a coil spring 10 was led and engaged with the ball bearing 12 of the case 9, and the coil spring 10 was moderately adjusted for its strength with the nut 18 and fixed. When the case 9 was combined with the case base plate 6, the sliding face of the rotor 8 came into contact with the tapered surface of the outside bottom of the torsional resonator, and when the case 9 was fixed with the screw 16, the sliding surface was strongly fixed under pressure to the resonator. By fitting the output gear 15 to the front end of the rotary shaft, a torsional mode driving piezoelectric motor was completed. When a sine wave voltage of 26.35 KHz at 10 volts was applied to the lead wires 13 and 13, the rotor 8 smoothly rotated and strong rotary torque was obtained from the output gear 15.

In the above examples, the pressure contact surfaces between the torsional resonator and the rotor were bare metal, but when they were coated with a thin film of hard rubber or the like, abrasion became markedly small, and the rotary sound became quiet. Coating with oil instead of a film coating gave the similar effect.

What is claimed is:

1. A torsional mode ultrasonic vibrator which comprises a piezoelectric thickness vibrating element, a torsional bending mode coupler coupled integrally with said piezoelectric thickness vibrating element and a cylindrical torsional mode resonator coupled integrally with said torsional bending mode coupler, said piezoelectric thickness vibrating element causing said cylindrical torsional mode resonator and torsional bending mode coupler to vibrate expansionally and compressionally so that said cylindrical torsional mode resonator and said torsional bending mode coupler generate a torsional vibration with the same frequency as a frequency of the vibration of said piezoelectric thickness vibrating element, said cylindrical torsional mode resonator having a flat surface which vibrates elliptically as the resultant motion between torsional vibration of said cylindrical torsional mode resonator and expansion compression vibration of said piezoelectric thickness vibrating element.

2. The torsional mode ultrasonic vibrator according to claim 1, wherein a torsion mode coupler is arranged between the piezoelectric vibrating element and the torsional mode resonator.

3. The torsional mode ultrasonic vibrator according to claim 2, wherein a longitudinal mode resonator is arranged integral with and between the torsional mode coupler and the torsional mode resonator.

4. The torsional mode ultrasonic vibrator according to claim 2, wherein the tickness and the diameter of the cylindrical torsional resonator against the length thereof is so determined that travelling waves occur on the cylindrical surface of the cylindrical torsional resonator in the circumferential direction.

5. The torsional mode ultrasonic vibrator according to claim 2, wherein the tickness and the diameter of the cylindrical torsional resonator against the length thereof is so determined that standing waves occur on the cylindrical surface of the cylindrical torsional resonator in the circumferential direction.

6. The torsional mode ultrasonic vibrator according to claim 2, wherein the tickness and the diameter of the cylindrical torsional resonator against the length thereof is so determined that there occur a pair of eliptical vibrations each vibrating in the reversed direction at at least one pair of the positions on the end surface of and symmetrical with reference to the axis of the cylindrical torsion mode resonator.

7. A piezoelectric motor comprising a rotor and a stator which is pressure contacted with the rotor, said stator comprising a torsional mode ultrasonic vibrator formed by an integral combination of a piezoelectric thickness vibrating element and a torsional bending mode coupler and formed by an integral combination of said torsional bending mode coupler and a cylindrical torsional mode resonator, said piezoelectric thickness vibrating element acting to vibrate expansionally and compressionally said torsional bending mode coupler and said torsional mode resonator so that said torsional bending mode coupler and said torsional mode resonator generate a torsional vibration with the same frequency as the frequency of the vibration of said piezoelectric thickness vibrating element, said torsional mode resonator having a flat surface which vibrates elliptically as the resultant motion between said torsional vibration of said torsional mode resonator and expansion-compression vibrator of said piezoelectric thickness vibrating element and which surface is adapted to abut onto the rotor so that the rotor can be driven by the elliptical vibration of the flat surface due to contact between the rotor and the flat surface of said torsional mode resonator.

8. The torsional mode piezoelectric motor according to claim 7, wherein the motor is reversible by switching the frequency of the power source applied to the piezoelectric thickness vibrator.

9. The torsional mode piezoelectric motor according to claim 7, wherein a cylindrical torsional mode resonator is used so as to generate ultrasonic standing waves each of the loops of which forms an eliptical locus and the contact point of the rotor is positioned at any one of the loops.

* * * * *